United States Patent [19]
Zeisberger

[11] 3,767,444
[45] Oct. 23, 1973

[54] PIGMENT COMPOSITION FOR COLORING POLYPROPYLENE

[75] Inventor: Robert Zeisberger, Besigheim, Germany

[73] Assignee: G. Siegle & Co. GmbH, Stuttgart, Germany

[22] Filed: Dec. 1, 1971

[21] Appl. No.: 203,857

[52] U.S. Cl......... 106/308 R, 106/272, 106/308 M, 106/308 Q, 260/28.5, 260/41 B, 260/41 C
[51] Int. Cl.......................... C08f 45/04, C08f 45/14
[58] Field of Search................... 106/308 M, 308 Q, 106/272; 260/41 C, 28.5 A, 41 B

[56] References Cited
UNITED STATES PATENTS
3,586,247  6/1971  Perrins........................... 106/308 M
FOREIGN PATENTS OR APPLICATIONS
1,265,702  4/1968  Germany.......................... 260/41 C
1,013,104  5/1962  Great Britain..................... 260/41 C

*Primary Examiner*—Delbert E. Gantz
*Attorney*—Kurt Kelman and Hans Berman

[57] ABSTRACT

Polypropylene is colored readily and homogeneously by adding to the molten polymer a pigment composition consisting of polypropylene wax as a carrier, a pigment dispersed in the carrier, and a non-ionic dispersing agent in an amount sufficient to disperse the pigment in the wax at a temperature above the melting point of the latter. Many pigments and dispersing agents stable at the melting temperature of polypropylene for a period sufficient to permit dispersing the pigment in the molten polymer are commercially available.

12 Claims, No Drawings

PIGMENT COMPOSITION FOR COLORING POLYPROPYLENE

This invention relates to the coloring of polypropylene, and particularly to a pigment composition suitable for this purpose.

Polypropylene is colored almost exclusively by means of pigments mixed with the polymer in bulk prior to shaping. When the conventionally pigmented polymer melt is extruded in the manufacture of fibers or similar continuous shapes of relatively small cross section, the pigments cause clogging of the extrusion nozzles and a costly interruption of operations frequent enough to increase the production cost by a significant amount. Non-uniform dispersion of the pigment in the polymer also can cause local weakening of the fibrous material and breaks during further processing. The color strength and transparency or translucency of polypropylene fibers containing inadequately dispersed pigments is impaired.

It is common practice to incorporate the pigments in the molten polymer in the form of pigment compositions essentially consisting of a carrier and of the pigment dispersed in the carrier. The pigments employed must be stable at the temperature of the molten polymer for a reasonable period, and there is a wide choice of organic and inorganic pigments meeting this requirement. However, the materials available heretofore as carriers for the pigments are few and not entirely satisfactory as previously employed.

Polypropylene itself has been proposed as a carrier for pigment compositions of high pigment content. However, pigment compositions containing polypropylene as a carrier are extremely viscous and can be prepared only on very heavy mixers or kneaders which are expensive to build and to operate. The amount of pigment which can be incorporated in polypropylene even on heavy kneaders presently available is limited because the viscosity of the composition increases sharply with increasing pigment content.

Amorphous polypropylene has also been recommended heretofore as a carrier material in pigment compositions, but was found unsatisfactory because of difficulties in dispersing pigments in this carrier, and because of the tackiness of the pigment compositions so prepared which is due to atactic material in amorphous polypropylene.

The term "atactic" as employed herein designates macromolecules having randomly arranged side chains as compared to the uniform arrangement of the side chains in the macromolecules of isotactic polypropylene.

It is another disadvantage of pigment preparations containing amorphous polypropylene as a carrier that the coloring effects produced are greatly affected by the temperature at which the compositions are incorporated in the bulk of the polypropylene. Adding a copolymer of ethylene and propylene to the amorphous polypropylene carrier has not produced adequate improvement.

It has further been proposed to employ polypropylene waxes as pigment carriers. Such waxes are prepared by heating isotactic polypropylene beyond its melting point to a relatively high temperature and/or for relatively long periods as will be described hereinbelow in more detail. The waxes are compatible with isotactic polypropylene which is the predominant polypropylene type in the manufacture of fibers and other shapes. It has been common practice to grind the polypropylene wax together with the pigment in aqueous suspension in a mill equipped with solid grinding bodies such as balls or pebbles. The ground material is separated from much of the water on a suction filter, washed with fresh water on the filter, and then dried.

The heterogeneous pigment compositions so produced are superior to the earlier compositions described above, but adequately uniform dispersion of the pigment in the ultimate polypropylene mass still could not be achieved. Moreover, the manufacture of pigment compositions by wet grinding requires enough time and labor to be quite costly. Surfactants added to the aqueous suspension for the grinding step proper are removed during washing and are not available for dispersing the pigment in the polypropylene.

The primary object of the invention is the provision of a pigment composition which disperses uniformly in molten isotactic polypropylene and is free from the shortcomings of known composition referred to above so as to produce colors of high intensity without interfering with the operation of extrusion equipment and without impairing the quality of fibers or other extrudates.

It has been found that pigments can be dispersed uniformly in propylene wax in the absence of water and in the presence of a nonionic dispersing agent at the melting temperature of the polypropylene wax on a kneader which exerts shearing stresses on the processed material.

It is preferred first to melt the propylene wax on the kneader at about 160° to 180°C, thereafter to work the dispersing agent into the molten wax, and last to incorporate the dry pigment in the melt while maintaining a temperature of about 170°C.

If isotactic polypropylene is to be colored by a relatively heavy concentration of pigment, and under operating conditions which require particularly rapid dispersion of the pigment composition in the molten polypropylene, it is preferred to add isotactic polypropylene to the pigment composition during its preparation so that the carrier portion of the composition may consist of a mixture of polypropylene wax and isotactic polypropylene in which the isotactic polypropylene may amount to as much as 80 percent by weight, there being no lower limit to the amount of this material that may usefully be employed.

The isotactic polypropylene is readily combined with the polypropylene wax by first melting the wax on the kneader and thereafter working the isotactic polypropylene into the molten wax. The use of very heavy equipment, such as a Banbury mixer, is not required for this mixing step nor for the subsequent addition of the pigment and dispersing agent if the isotactic polypropylene does not exceed 80 percent of the combined weight of isotactic polypropylene and polypropylene wax.

Best results are obtained by the use of dispersing agents having an HLB value (hydrophile-lipophile balance) [W.C. Griffin, J. Soc. Cosmetic Chemists 1 (1949) 311; 5 (1954) 249] lower than ten, that is, in the range of strong lipophile attraction. Esters of polyhydric alcohols with aliphatic, monocarboxylic acids having 10 to 18 carbon atoms are representative of the many suitable dispersing agents which are staple articles of commerce, and are preferred.

The dispersing agents are most effective in amounts of 1 to 5 percent of the weight of the pigment composition. Higher concentrations of dispersing agents up to 10 or 15 percent do not unfavorably affect the properties and operating characteristics of the pigment preparations, but do not produce further improvement and are thus uneconomical.

The amount of pigment must be selected according to the desired effect and to the nature of the pigment. It is not usually practical to use less than 10 percent. A certain amount of experimentation is unavoidable for working with a pigment on which information is not available from earlier runs under specific conditions. The compositions of the invention generally are capable of containing a higher percentage of inorganic pigments than of organic pigments, the upper limit for inorganic pigments usually varying between 60 and 80 percent, that for organic pigments between 35 and 40 percent, all percentage values herein being by weight unless specifically stated otherwise. Enough pigment should be added to the carrier and dispersing agent to give desirable kneading chracteristics to the mixture at the melting point of the carrier. Typical pigment compositions of the invention may contain 30 to 40 percent copper phthalocyanine pigments or 70 to 80 percent cadmium red.

Nonionic surfactants having an HLB value lower than ten are generally effective, but the esters of glycerol and other polyhydric alcohols with higher aliphatic monocarboxylic acids are preferred because of their low cost, the mono- and diesters of such alcohols with stearic, palmitic, and oleic acid being least expensive. Nonionic surfactants which are obtained by condensation of ethylene oxide with alkanols, alkylphenols and carboxylic acids are commonly available in commercial quantities and are equally effective but more costly.

The pigment compositions of the invention disperse readily in isotactic polypropylene and produce brilliant coloring effects. They are equally applicable to the coloring of types of polypropylene other than isotactic polypropylene, but are not as unique in the ease of application to amorphous polypropylene as they are in the coloring of isotactic polypropylene.

The following Examples are further illustrative of the invention.

EXAMPLE 1

Isotactic polypropylene polymer which was 94.4 percent insoluble in heptane and had a melting point of about 165°C as determined on a Kofler melting point apparatus was held for 30 minutes at 330°C. The mass had a relatively low viscosity and was permitted to cool under stirring. A wax-like granulate was obtained and could be pulverized in a hammer mill when cooled with dry ice. After screening for removal of particles larger than 0.5 mm, there was obtained a slightly brownish powder of polypropylene wax melting at about 138°C.

When the procedure described above was repeated, but the polymer was heated in a nitrogen atmosphere rather than in the open air, the polypropylene wax powder produced had a melting point of 149°C. A product melting at 141°C was obtained when the heating period under a nitrogen blanket was extended to 90 minutes, but the temperature reduced to 300°C. Melting at 350°C for 30 minutes yielded a wax melting at about 128°C, and a wax melting at about 112°C was formed by heating for 20 minutes at 400°C.

Polypropylene waxes may thus be prepared to any desired melting point in an approximate range of 110° to 150°C by varying the heating time and temperature of the isotactic polypropylene employed as a starting material.

EXAMPLE 2

A kneader mixer having a four-liter trough equipped with Z-type blades and a heating jacket was charged with 877.8 g polypropylene wax produced by heating isotactic polypropylene for four hours at 320°C. The wax was kneaded and simultaneously heated to 170°C. 46.2 g Commercial dispersing agent consisting of a mixture of glycerol mono- and distearate and having an HLB value of 3.2 was homogeneously worked into the melt. Thereafter 396 g copper phthalocyanine powder ($\beta$ modification) was added.

The viscous mass so obtained was still capable of being kneaded without difficulty on the small apparatus, and kneading was continued for one hour at 170°C after the pigment had been added. Upon cooling, there was obtained a brittle, non-tacky mass which was ground to a free-flowing powder by the kneader blades.

The pigment composition contained 30 percent coloring matter, dispersed readily and uniformly in molten isotactic polypropylene and produced a bright, strong color.

About the same results were obtained when sorbitan monooleate was employed as a dispersing agent in the same amount.

EXAMPLE 3

The general procedure of Example 2 was repeated, but one half (438.9 g) of the polypropylene wax was replaced by an equal weight of isotactic polypropylene. The wax was fused first at about 170°C with kneading, and the isotactic polypropylene was added thereafter. A pigment composition having properties similar to those described in Example 2 was obtained.

Only minor and usually insignificant changes in the properties of the pigment composition are caused by selecting polypropylene waxes varying in melting temperature between approximately 110° and 150°C., and the choice of dispersing agent also has not much influence on the result, as long as the dispersing agent does not break down at the temperature at which it is processed. Some suitable dispersing agents have been referred to in the Examples, and it will be appreciated that they may be interchanged or that others may be substituted, for example, sorbitan monolaurate, sorbitan monopalmitate, sorbitan monostearate, sorbitan tristearate, sorbitan trioleate, glycerol-sorbitan laurate, and polyoxyethylene sorbitan monooleate. Others will readily suggest themselves to those skilled in the art.

Temperature resistance is the only important limitation on the use of pigments, and only a few of those suitable for the invention can be enumerated here. Inorganic pigments which have been employed successfully include the oxides of iron and titanium and various grades of finely dispersed carbon, particularly lampblack and channel black. Many anthraquinone pigments, vat dyes, and chlorinated and nonchlorinated phthalocyanin dyes have the required temperature resistance. Members of the indigo group, quinacridon and dioxazin pigments, and pigments derived from perylene tetracarboxylic acid have been employed with good results.

It should be understood, therefore, that the foregoing disclosure relates only to preferred embodiments of the invention, and that it is intended to cover all changes and modifications in the examples of the invention herein chosen for the purpose of the disclosure which do not constitute departures from the spirit and scope of the invention set forth in the appended claims.

What is claimed is:

1. A pigment composition for coloring polypropylene essentially consisting of
   a. polypropylene wax as a carrier;
   b. a pigment uniformly dispersed in said carrier; and
   c. a non-ionic dispersing agent in an amount sufficient to disperse said pigment in said carrier at a temperature above the melting point of said carrier,
      1. said pigment and said dispersing agent being stable at said temperature for a period sufficient to permit dispersing said pigment in the molten carrier.

2. A composition as set forth in claim 1, said temperature being between 160° and 180°C.

3. A composition as set forth in claim 1, further containing isotactic polypropylene as a diluent for said polypropylene wax.

4. A composition as set forth in claim 3, wherein the amount of said diluent is not greater than 80 percent of the combined weight of said carrier and of said diluent.

5. A composition as set forth in claim 1, wherein said dispersing agent has an HLB value of less than 10.

6. A composition as set forth in claim 5, wherein said dispersing agent is an ester of a polyhydric alcohol with an aliphatic monocarboxylic acid having 12 to 18 carbon atoms.

7. A composition as set forth in claim 1, wherein said amount is 1 to 5 percent of the weight of said composition, 8. A composition as set forth in claim 7, wherein said pigment is an organic pigment, the weight of said pigments being approximately 35 to 40 percent of the weight of said composition.

9. A composition as set forth in claim 7, wherein said pigment is an inorganic pigment, the weight of said pigment being approximately 60 to 80 percent of the weight of said composition.

10. A method of preparing a pigment composition suitable for coloring polypropylene which comprises intimately mixing a pigment with polypropylene wax as a carrier and with an effective amount of a nonionic dispersing agent at a temperature at which said wax is liquid until a homogeneous viscous mass is obtained, cooling said mass until solidified, and comminuting the solidified mass.

11. A method as set forth in claim 10, wherein the weight of said dispersing agent is 1 to 5 percent of the weight of said mass, and the weight of said pigment is 10 to 40 percent when said pigment is an organic pigment, and 10 to 80 percent when said pigment is an inorganic pigment.

12. A composition as set forth in claim 1, wherein said dispersing agent is uniformly dispersed in said carrier.

* * * * *